(12) United States Patent
McAdam et al.

(10) Patent No.: US 10,939,602 B2
(45) Date of Patent: Mar. 9, 2021

(54) WORK VEHICLE

(71) Applicant: MULTIHOG R&D LIMITED, Dundalk (IE)

(72) Inventors: James McAdam, Carlingford (IE); Gerard McHugh, Carrickmacross (IE); Anthony Duff, Dundalk (IE); Dallan McHugh, Dundalk (IE); Daniel McElchar, Castlefin (IE); Samuel Hampshire, Drogheda (IE)

(73) Assignee: MULTIHOG R&D LIMITED, Dundalk (IE)

( * ) Notice: Subject to any disclaimer, the term of this patent is extended or adjusted under 35 U.S.C. 154(b) by 0 days.

(21) Appl. No.: 15/781,883

(22) PCT Filed: Dec. 7, 2016

(86) PCT No.: PCT/IE2016/000022
§ 371 (c)(1),
(2) Date: Jun. 6, 2018

(87) PCT Pub. No.: WO2017/098491
PCT Pub. Date: Jun. 15, 2017

(65) Prior Publication Data
US 2018/0359902 A1 Dec. 20, 2018

(30) Foreign Application Priority Data

Dec. 7, 2015 (IE) .................................. 2015/0430

(51) Int. Cl.
*A01B 59/06* (2006.01)
*E01H 5/06* (2006.01)
*E01H 5/08* (2006.01)

(52) U.S. Cl.
CPC .......... *A01B 59/066* (2013.01); *A01B 59/062* (2013.01); *A01B 59/064* (2013.01);
(Continued)

(58) Field of Classification Search
CPC .......... A01B 59/066; E01H 5/061; E01H 5/08
See application file for complete search history.

(56) References Cited

U.S. PATENT DOCUMENTS

2009/0084566 A1 4/2009 Bernhardt et al.

FOREIGN PATENT DOCUMENTS

DE 37 36 872 A1 5/1989
DE 43 25 567 A1 2/1995
(Continued)

OTHER PUBLICATIONS

International Search Report for PCT/IE2016/000022 dated Mar. 23, 2017 (PCT/ISA/210).
(Continued)

*Primary Examiner* — Tara Mayo-Pinnock
(74) *Attorney, Agent, or Firm* — Sughrue Mion, PLLC

(57) ABSTRACT

A work vehicle (1) comprises a coupling apparatus (18) for coupling an attachment to the forward end (8) of the work vehicle (1). The coupling apparatus (18) comprises a three point linkage mechanism having a pair of lower coupling elements (19) and an upper coupling element (25). A first carrier element (22) is pivotally coupled to a forward chassis part (14) of the work vehicle (1) by a pair of main transverse pivot shafts (35) which define a main transverse pivot axis (33). A second carrier element (23) carries the lower coupling elements (19) and is pivotally coupled to the forward chassis part (14) about the main transverse pivot axis (33) and about a main longitudinal pivot axis (45). A main longitudinal pivot shaft (46) extending rigidly from the second carrier element (23) pivotally engages the first carrier element (22) and terminates in a swivel bearing (50) which pivotally and swivelably couples the main longitudinal pivot shaft (46) to an intermediate transverse pivot shaft (54) which also defines the main transverse pivot axis (33), so
(Continued)

that the second carrier element (23) and the first carrier element (22) are pivotal about the main transverse pivot axis (33), and the second carrier element (23) is pivotal about the main longitudinal pivot axis (45) to facilitate upward and downward movement of an attachment coupled to the coupling apparatus (18) about the main transverse pivot axis (33) and tilting movement of the attachment about the main longitudinal pivot axis (45).

20 Claims, 14 Drawing Sheets

(52) U.S. Cl.
CPC ........... *A01B 59/068* (2013.01); *E01H 5/061* (2013.01); *E01H 5/08* (2013.01)

(56) References Cited

FOREIGN PATENT DOCUMENTS

| | | |
|---|---|---|
| EP | 2 042 011 A1 | 4/2009 |
| EP | 2 140 748 A1 | 1/2010 |
| EP | 2 457 428 A1 | 5/2012 |

OTHER PUBLICATIONS

Written Opinion of the International Searching Authority for PCT/IE2016/000022 dated Mar. 23, 2017 (PCT/ISA/237).

WORK VEHICLE

CROSS REFERENCE TO RELATED APPLICATIONS

This application is a National Stage of International Application No. PCT/IE2016/000022 filed Dec. 7, 2016, claiming priority based on Irish Patent Application No. S2015/0430, filed Dec. 7, 2015, the disclosures of which are incorporated by reference herein.

The present invention relates to a work vehicle, and in particular, to a work vehicle of the type which is suitable for carrying and powering attachments, for example, crop and lawn mowers, hedge cutters, sprayers for herbicides, insecticides and fertilizers, elongated transversely extending plough blades, elongated transversely extending cylindrical brushes, snow blowers and other such attachments.

Work vehicles, which are commonly referred to as wheeled work vehicles are well known, and in general are of a relatively compact size, and comprise a chassis with a forwardly mounted driver's cab, and a rearwardly mounted engine to provide motive power to the work vehicle, and also to power the attachments mounted on the work vehicle. The chassis of such work vehicles may be provided in the form of a single rigid chassis or as a two part chassis having a forward chassis part and a rearward chassis part. The forward and rearward chassis parts of the chassis, in general, are pivotally connected about a substantially vertically extending pivot axis about which the forward and rearward chassis parts are pivotal relative to each other for steering of the work vehicle.

In general, such work vehicles, whether a single chassis, or two part chassis work vehicles are equipped to carry attachments adjacent the front end of the work vehicle. Provision is made to power such attachments, and in general, one or more hydraulic power sources, one or more electrical power sources and a mechanical power source in the form of a power take-off shaft are provided adjacent the forward end of the work vehicle for coupling to the attachment as required. Various coupling arrangements are provided for coupling such attachments to the forward end of the work vehicle, including special purpose coupling means and also the coupling arrangements may include a three-point linkage mechanism. It is important that attachments when coupled to the forward end of the work vehicle are free to follow the contours of the ground over which the work vehicle is traversing. In general, three-point linkage mechanisms are capable of rising and falling and tilting relative to the work vehicle in order to accommodate rising and falling as well as tilting movement of the attachment as the attachment follows the contours of the ground. However, a problem with such work vehicles is that the rising, falling and tilting movement provided by three-point linkages of known work vehicles for such attachments is not always adequate, and additionally, the loads which can be carried by such three-point linkages in some cases are limited. This is unsatisfactory.

There is therefore a need for a work vehicle which addresses at least one of these problems.

The present invention is directed towards providing such a work vehicle.

According to the invention there is provided a work vehicle comprising a chassis, and a coupling apparatus for coupling an attachment to the work vehicle, the coupling apparatus comprising a first carrier element pivotally coupled to the chassis about a main transverse pivot axis extending transversely of the direction of normal forward motion of the work vehicle, and a second carrier element carrying a pair of transversely spaced apart first coupling elements, the second carrier element being pivotally coupled to the chassis about the main transverse pivot axis and about a main longitudinal pivot axis, the main longitudinal pivot axis extending substantially perpendicularly to and through the main transverse pivot axis, and the second carrier element being pivotal relative to the first carrier element about the main longitudinal pivot axis.

Preferably, the main longitudinal pivot axis intersects the main transverse pivot axis.

In one aspect of the invention the second carrier element is pivotally coupled to the chassis by a swivel coupling defining a transverse pivot axis and a longitudinal pivot axis and providing pivotal movement about the respective transverse and longitudinal pivot axes, the swivel coupling being coupled to the chassis with the transverse pivot axis thereof substantially coinciding with the main transverse pivot axis, and with the longitudinal pivot axis thereof substantially coinciding with the main longitudinal pivot axis.

In another aspect of the invention a main longitudinally extending pivot shaft defining the main longitudinal pivot axis extends from the second carrier element, the main longitudinal pivot shaft being coupled to the swivel coupling with the longitudinal axis of the swivel coupling coinciding with the main longitudinal pivot axis. Preferably, the main longitudinal pivot shaft is rigidly connected to the second carrier element. Advantageously, the main longitudinal pivot shaft is pivotal in the first carrier element about the main longitudinal pivot axis. Ideally, the main longitudinal pivot shaft extends from the second carrier element through the first carrier element to the swivel coupling.

In another aspect of the invention the first carrier element defines a pivot bore extending therethrough, and the main longitudinal pivot shaft extends through and is pivotal in the pivot bore of the first carrier element about the main longitudinal pivot axis. Preferably, the first carrier element is pivotally coupled to the chassis on at least one main transverse pivot shaft defining the main transverse pivot axis. Advantageously, the first carrier element is pivotally coupled to the chassis on a pair of the main transverse pivot shafts spaced apart from and axially aligned with each other, and defining the main transverse pivot axis. Ideally, the at least one main transverse pivot shaft is coupled to the chassis at transversely spaced apart locations.

In one aspect of the invention each main transverse pivot shaft is pivotally carried on a corresponding main pivot mounting on the chassis. Preferably, each main transverse pivot shaft is engageable with a corresponding main mounting bracket extending from the first carrier element.

In another aspect of the invention the first carrier element comprises a first transverse member extending substantially transversely of and perpendicularly to the main longitudinal pivot axis. Preferably, each main mounting bracket extend from the first transverse member.

In a further aspect of the invention the swivel coupling is carried on an intermediate transverse pivot shaft carried on the chassis and axially aligned with the at least one main transverse pivot shaft, the intermediate transverse pivot shaft defining with the at least one main transverse pivot shaft the main transverse pivot axis.

In another aspect of the invention the intermediate transverse pivot shaft is located intermediate the locations at which the main transverse pivot shafts are located.

Preferably, the swivel coupling comprises a swivel bearing having an inner shell mounted fast on the intermediate transverse pivot shaft, and an outer shell rotatably and swivelably mounted on the inner shell, so that the outer shell is pivotal on the inner shell about the main transverse pivot axis and the main longitudinal pivot axis. Advantageously, the swivel coupling is carried in a swivel coupling carrier extending from the main longitudinal pivot shaft.

In another aspect of the invention the first coupling elements are located on the second carrier element on respective opposite sides of the main longitudinal pivot axis. Preferably, the first coupling elements are equi-spaced apart from the main longitudinal pivot axis.

Advantageously, the first coupling elements are adjustably mounted on the second carrier element, so that the transverse spacing of the first coupling elements is adjustable.

In another aspect of the invention the second carrier element comprises a pair of guide members extending from the second carrier element, and a pair of corresponding carrier members carrying the respective first coupling elements slideably mounted relative to the guide members. Preferably, the guide members extend in a generally forwardly direction from the second carrier element. Advantageously, the guide members diverge outwardly from the second carrier element, and by sliding the carrier members in the guide members, the transverse spacing between the first coupling elements can be varied.

In one aspect of the invention the guide members extend from the second carrier element at an angle in the range of 30° to 90° relative to the main longitudinal pivot axis to define an included angle in the range of 60° to 180° between the diverging guide members. Preferably, the guide members extend from the second carrier element at an angle in the range of 35° to 70° relative to the main longitudinal pivot axis to define an included angle in the range of 70° to 140° between the diverging guide members. Advantageously, the guide members extend from the second carrier element at an angle of approximately 40° relative to the main longitudinal pivot axis with the guide members defining an included angle therebetween of approximately 80°.

In another aspect of the invention each guide member comprises one of a pair of inner and outer telescoping members, and the other one of the pair of the inner and outer telescoping members forms the corresponding carrier member. Preferably, each guide member comprises the outer telescoping member of the corresponding pair of inner and outer telescoping members.

In another aspect of the invention the second carrier element comprises a second transverse member extending transversely of and perpendicularly to the main longitudinal pivot axis. Preferably, the guide members extend from the second transverse member of the second carrier element.

Preferably, the main longitudinal pivot shaft extends centrally from the second transverse member of the second carrier element.

In one aspect of the invention a first carrier element urging means is provided for urging the first carrier element about the main transverse pivot axis and for in turn urging the second carrier element about the main transverse pivot axis. Preferably, the first carrier element urging means in coupled between the chassis and the first carrier element. Advantageously, the first carrier element urging means comprises one of a first hydraulic actuator and a first electrically powered actuator.

In one aspect of the invention the one of the first hydraulic actuator and the first electrically powered actuator is configurable in an active mode for pivoting the first carrier element about the main transverse pivot axis, and in a passive mode for permitting the first carrier element, and in turn the second carrier element to float relative to the chassis about the main transverse pivot axis.

In another aspect of the invention a second carrier element urging means is provided for urging the second carrier element about the main longitudinal pivot axis. Preferably, the second carrier element urging means is coupled between the first carrier element and the second carrier element. Advantageously, the second carrier element urging means comprises one of a second hydraulic actuator and a second electrically powered actuator.

In another aspect of the invention the one of the second hydraulic actuator and the second electrically powered actuator is configurable in an active mode for pivoting the second carrier element about the main longitudinal pivot axis, and a passive mode for permitting the second carrier element to float relative to the first carrier element about the main longitudinal pivot axis.

In another aspect of the invention the coupling apparatus is configured as a three-point linkage, the first coupling elements defining respective lower coupling elements of the three-point linkage, and a second coupling element being coupled to the chassis to form an upper coupling element of the three-point linkage.

In another aspect of the invention the second coupling element is rigidly coupled to the chassis at a level above the level at which the first carrier element is pivotally coupled to the chassis about the main transverse pivot axis.

In a further aspect of the invention the second coupling element is one of slideably and pivotally coupled to the chassis.

In a further aspect of the invention the coupling apparatus is configured for mounting adjacent a front end of the work vehicle. Alternatively, the coupling apparatus is configured for mounting adjacent a rear end of the work vehicle.

In one embodiment of the invention the coupling apparatus is configured for attaching one of a crop mower, a lawn mower, an elongated transversely extending plough blade, a hedge cutter, a rotatably mounted transversely extending cylindrical brush, a sprayer for a herbicide, an insecticide or a fertiliser, a snow blower or other such attachments to the work vehicle.

In another embodiment of the invention the work vehicle comprises a forward part and a rearward part coupled together about a substantially vertically extending primary pivot axis for facilitating steering of the work vehicle.

The advantages of the invention are many. By virtue of the fact that the second carrier element is pivotally coupled to the chassis about the main transverse pivot axis and the main longitudinal pivot axis, the second carrier element can readily rise and fall relative to the work vehicle, and can also readily tilt from one side to the other in order to allow an attachment coupled to the work vehicle by the coupling apparatus to more closely follow the contour of the ground as the work vehicle traverses over the ground. The fact that the second carrier element is pivotally coupled to the chassis about the main transverse pivot axis permits rising and falling of the second carrier element, and the fact that the second carrier element is pivotally coupled to the chassis about the main longitudinal pivot axis permits tilting of the second carrier element from one side of the work vehicle to the other.

By pivotally coupling the second carrier element to the first carrier element about the main longitudinal pivot axis, and also by pivotally coupling the second carrier element to the chassis about the main transverse pivot axis through the main longitudinal pivot shaft, a particularly robust coupling apparatus is provided, since the main longitudinal pivot shaft which defines the main longitudinal pivot axis extends through the first carrier element to the chassis where it is pivotally coupled about both the main longitudinal pivot axis and the main transverse pivot axis with the main longitudinal pivot axis extending perpendicularly to and intersecting the main transverse pivot axis. Since all the pivoting of the second carrier element about the main longitudinal pivot axis and about the main transverse pivot axis takes place about a single point, namely, the point of intersection of the main longitudinal pivot axis and the main transverse pivot axis, and since the second carrier element is pivotally coupled to the chassis about both the main transverse and the main longitudinal pivot axes by the longitudinal pivot shaft, which also extends through the first carrier element, the load carried by the second carrier element is transferred directly to the chassis through the main longitudinal pivot shaft. This maximises the load which can be carried by the coupling apparatus of the work vehicle.

The invention will be more clearly understood from the following description of a preferred embodiment thereof which is given by way of example only with reference to the accompanying drawings in which.

Figure 1:
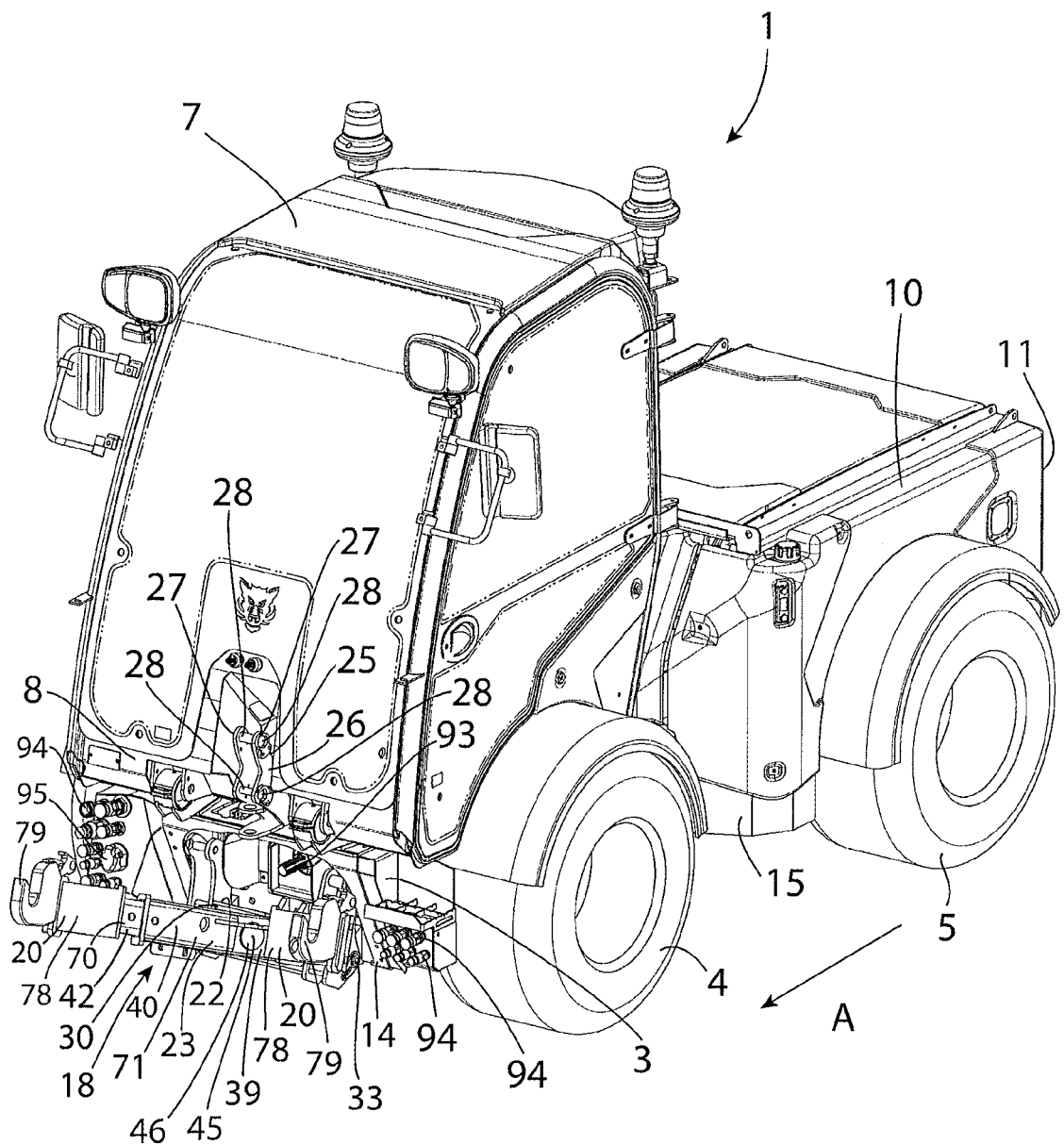
FIG. 1 is a perspective view of a work vehicle according to the invention.
Figure 2:
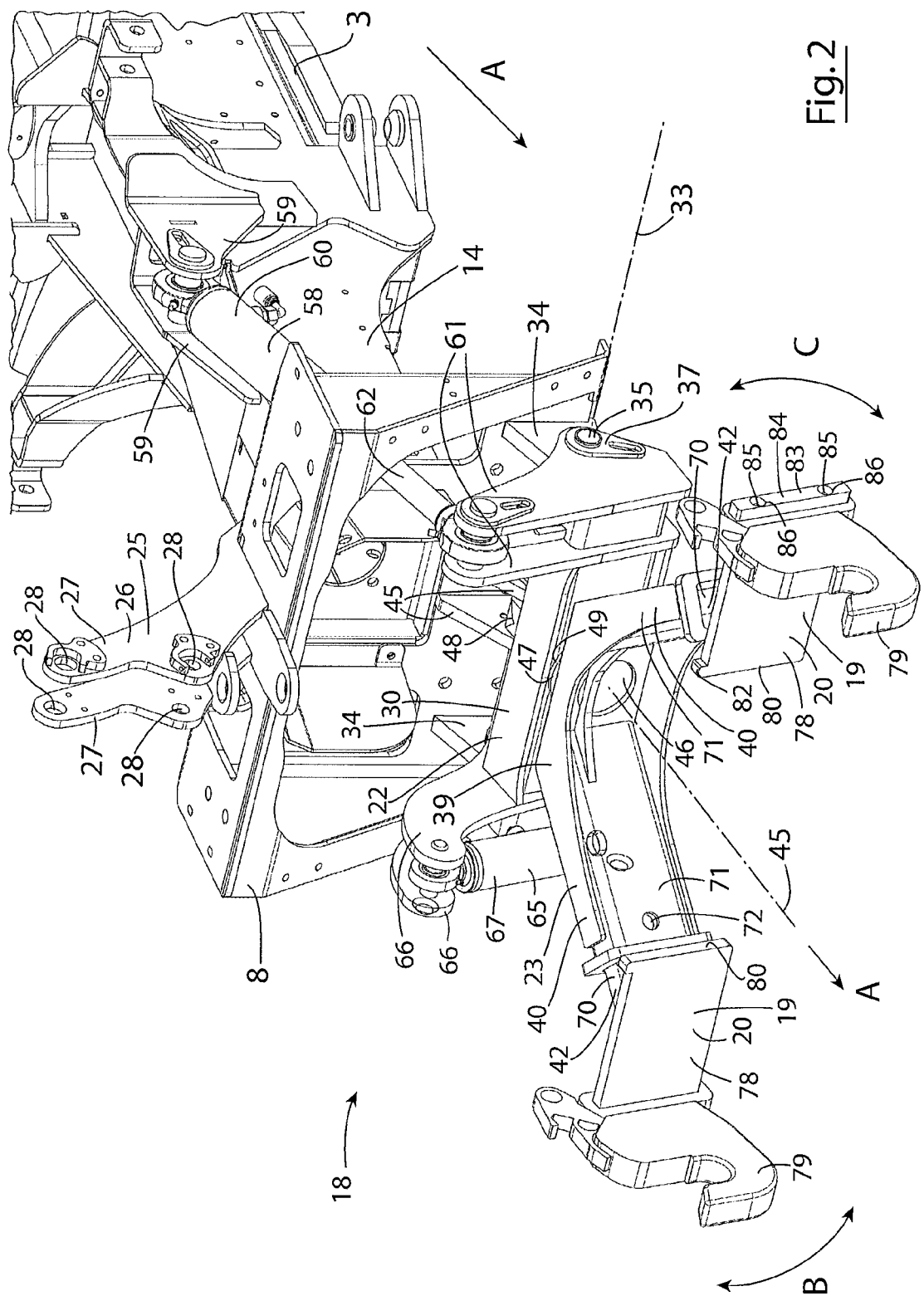
FIG. 2 is a perspective view of a portion of the work vehicle of FIG. 1.
Figure 3:
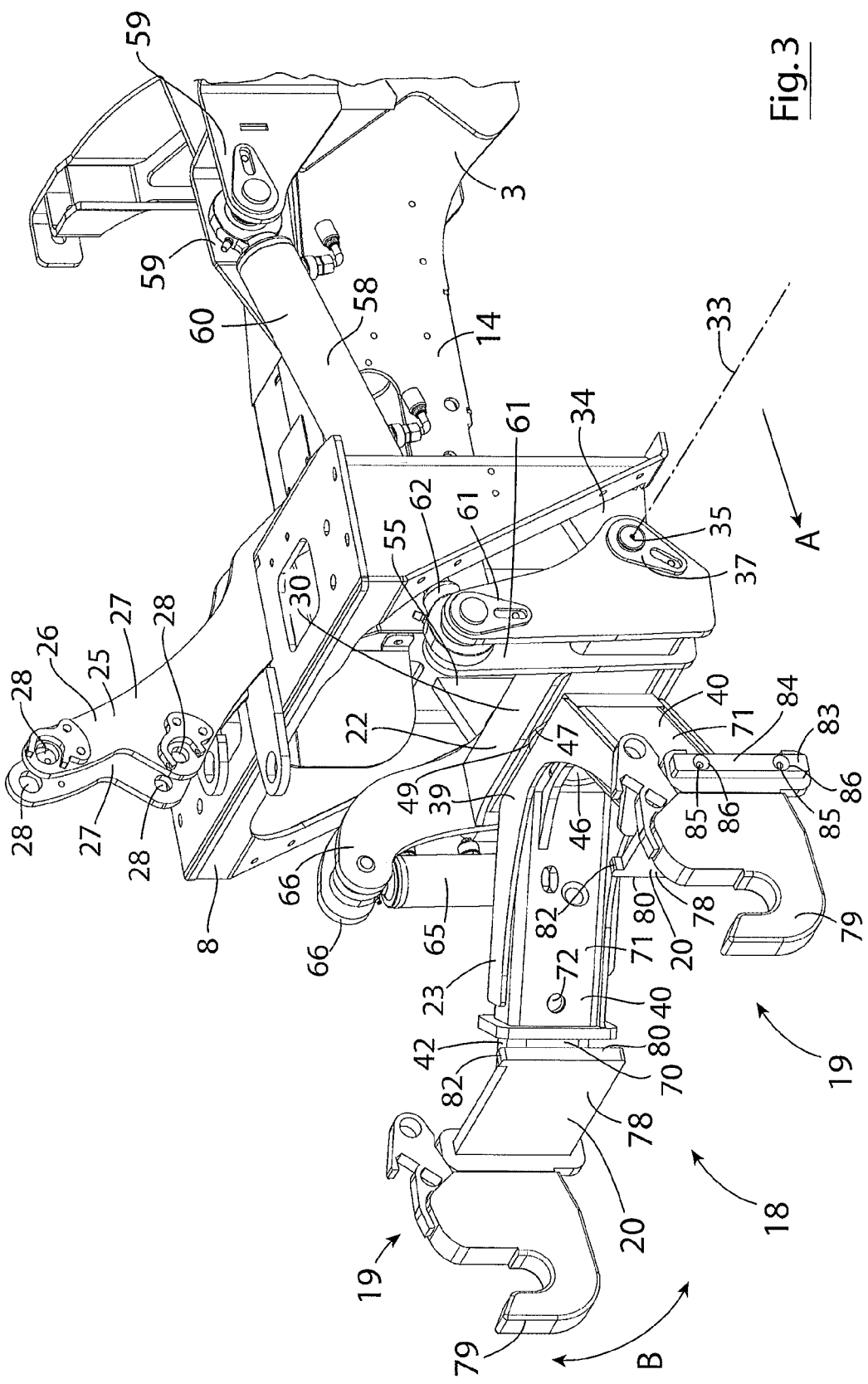
Figure 4:
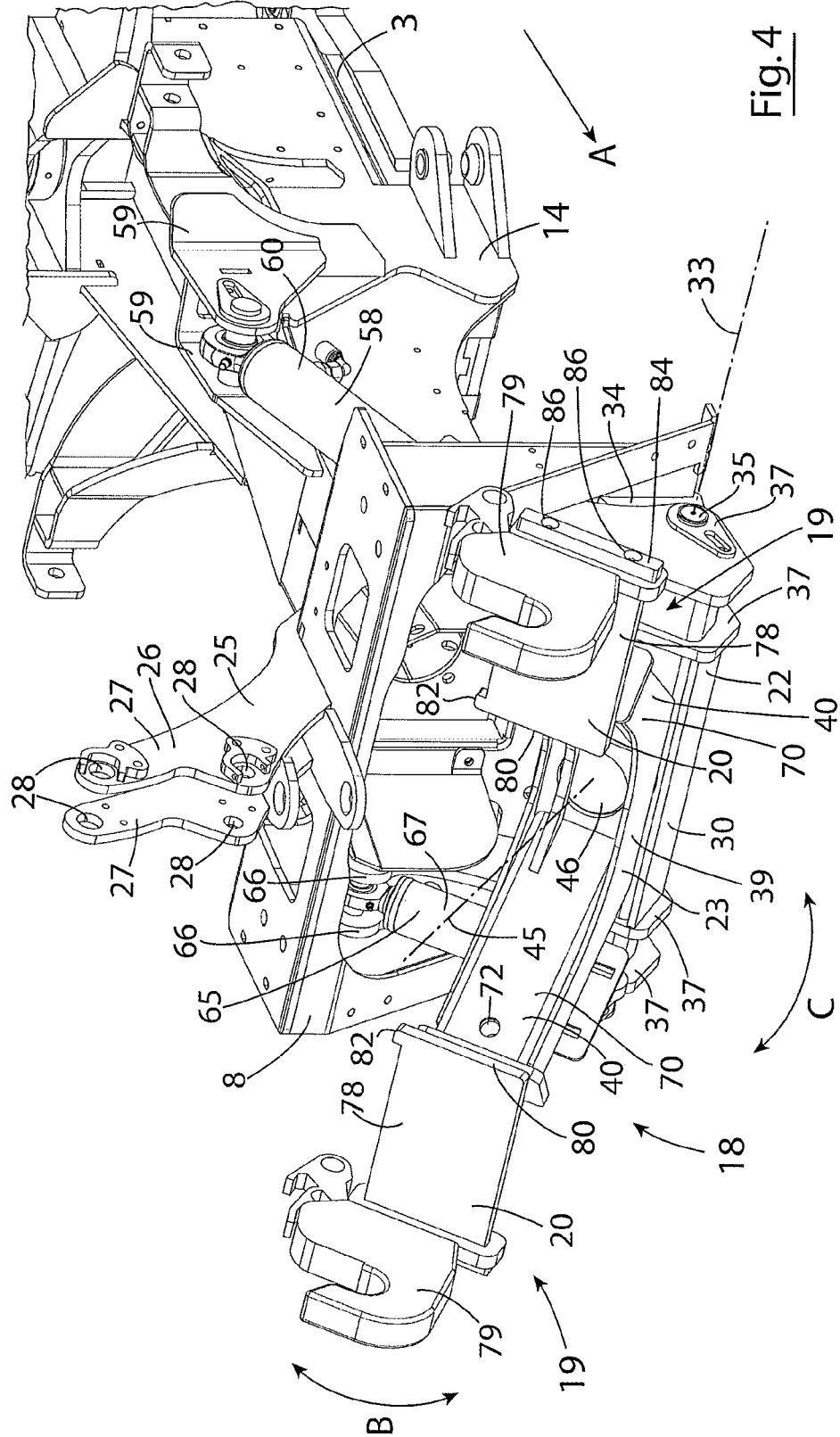
Figure 5:
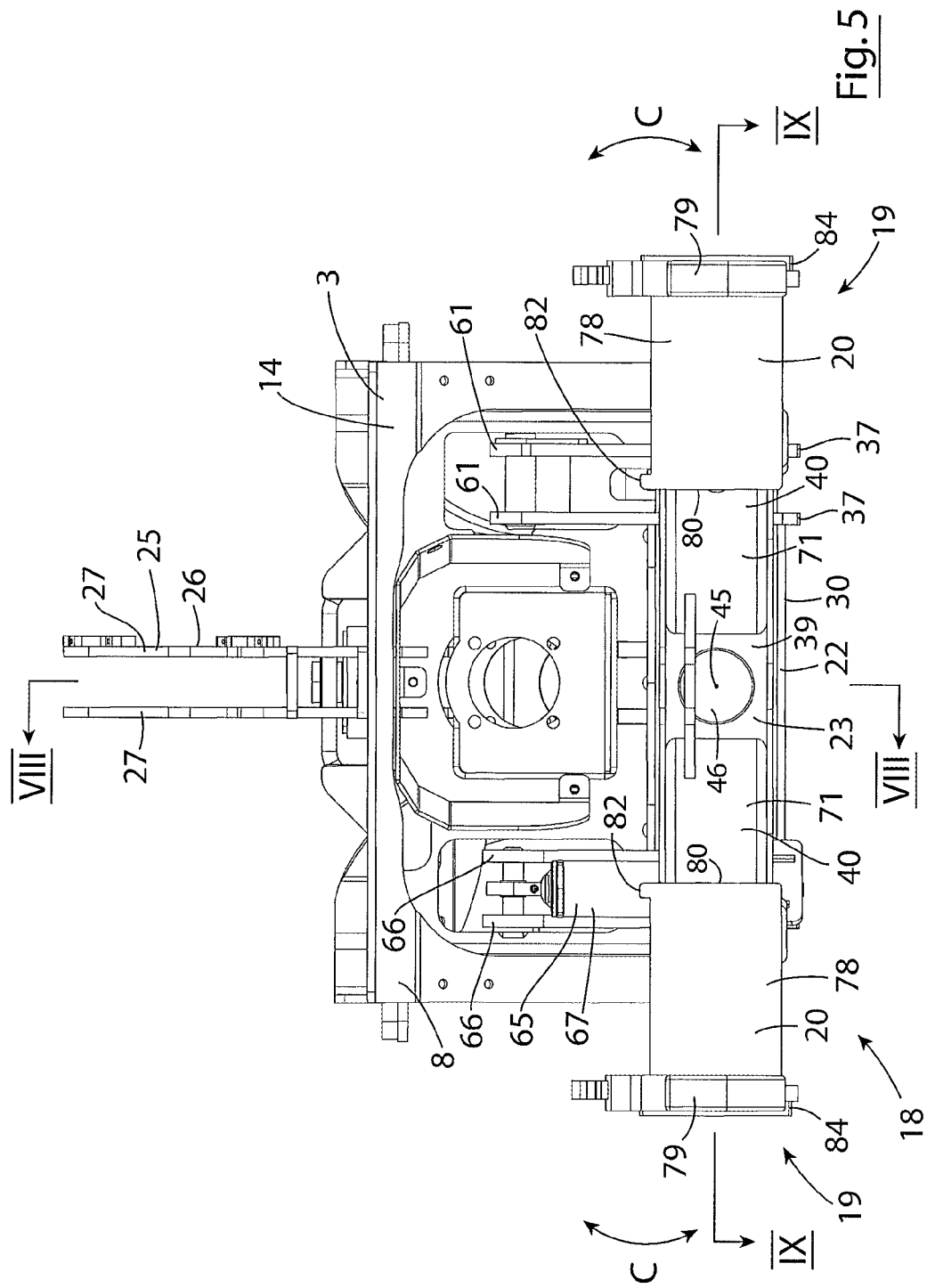
Figure 6:
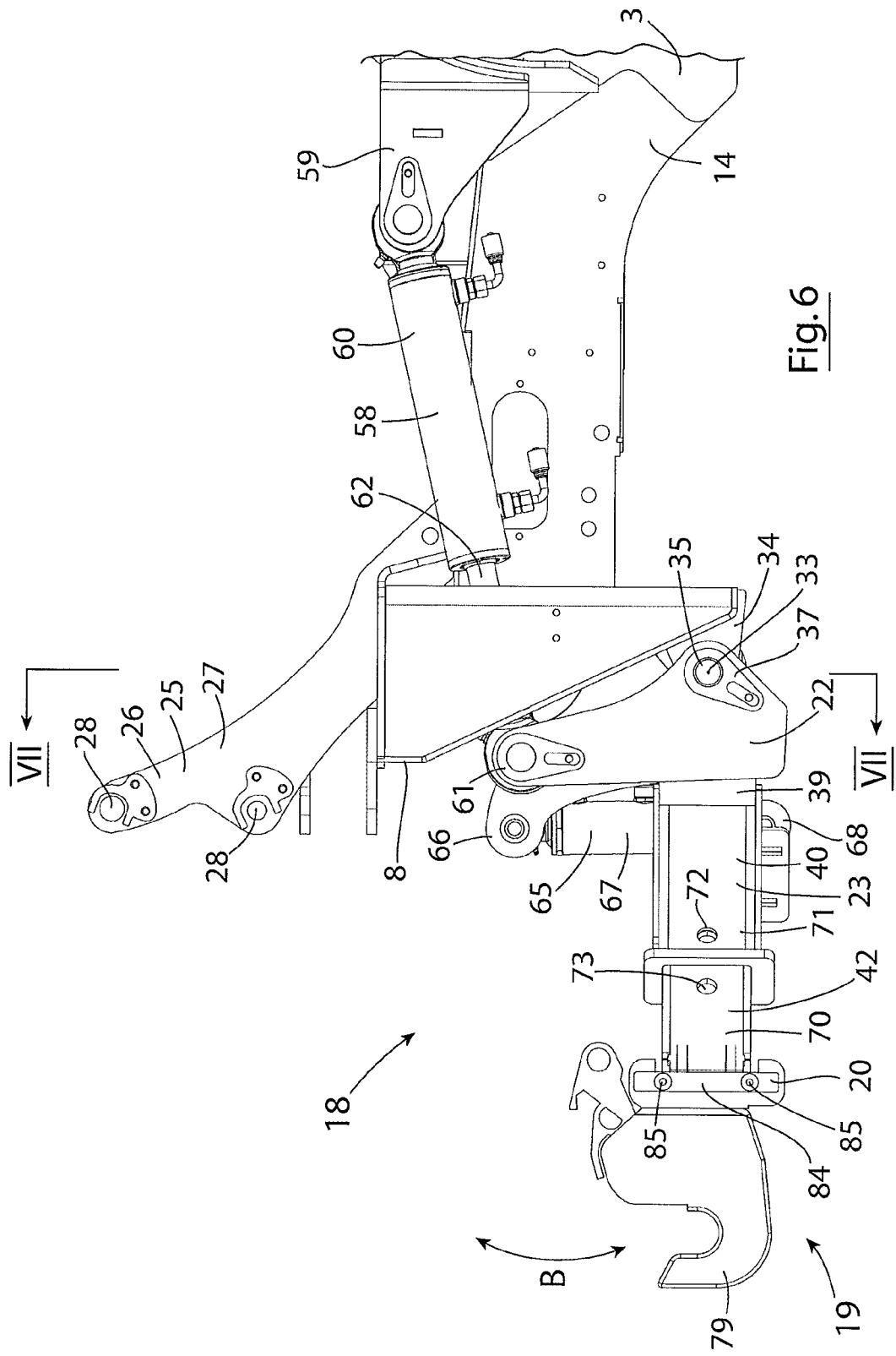
Figure 7:
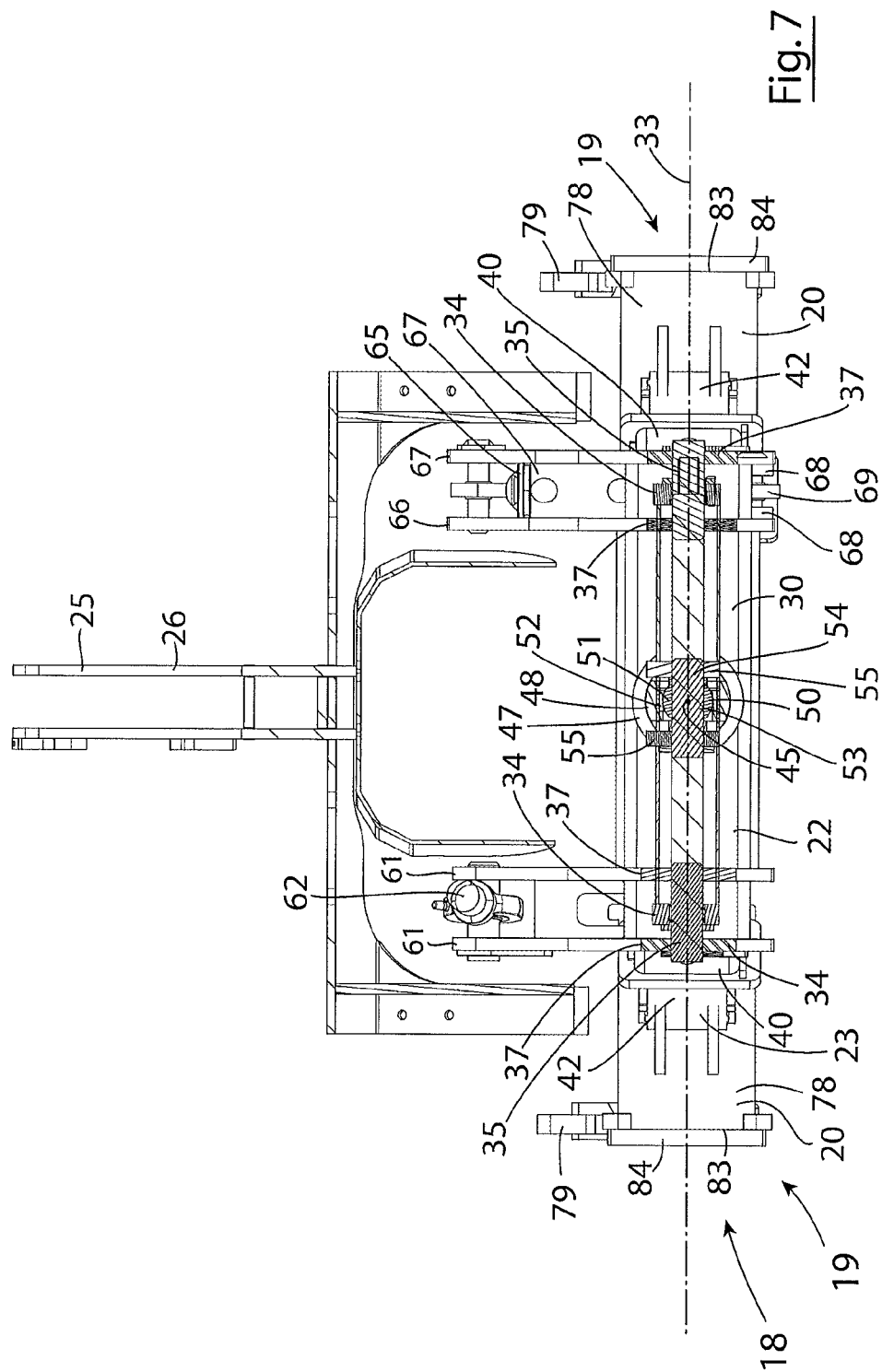
Figure 8:
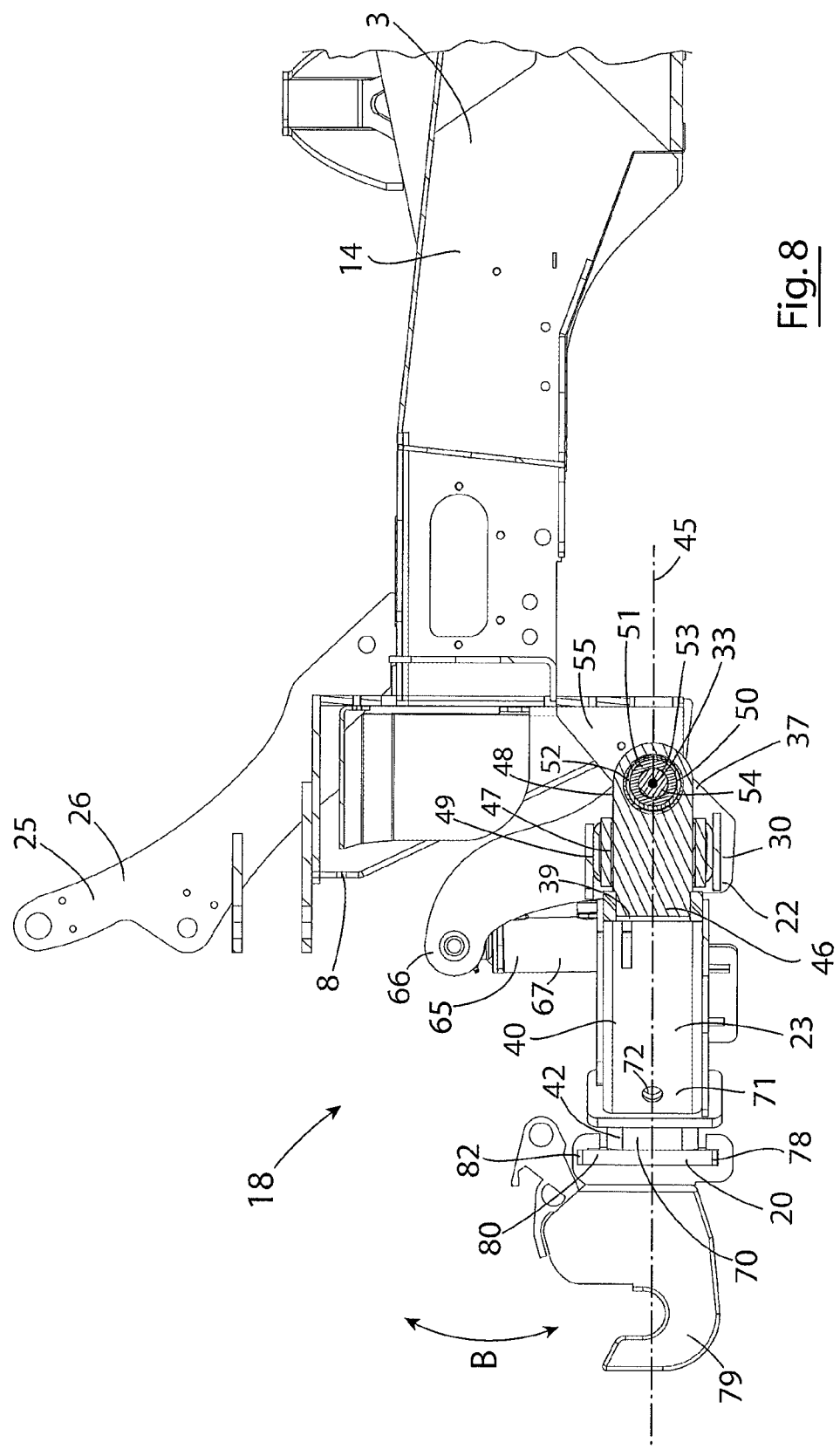
Figure 9:
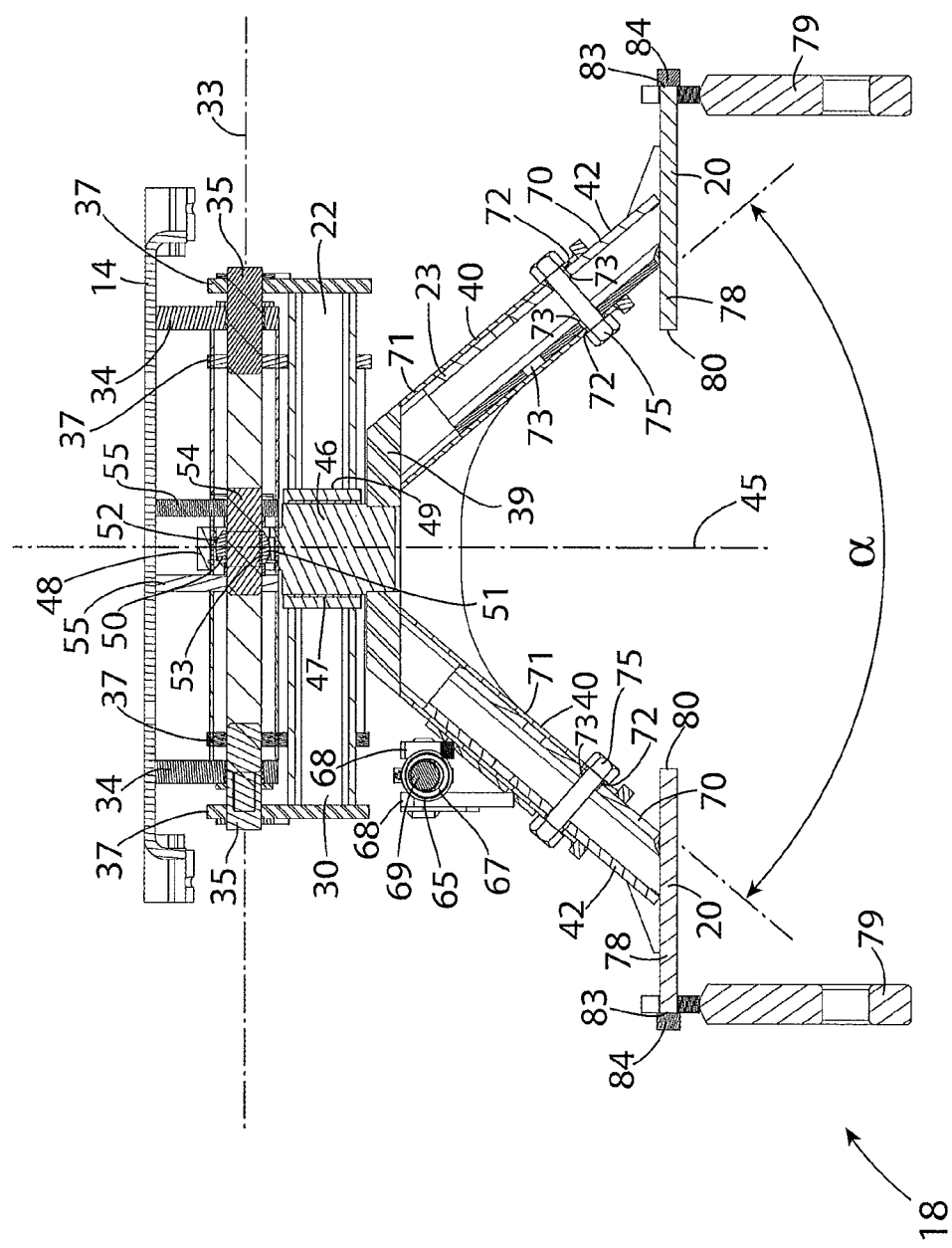
Figure 10:
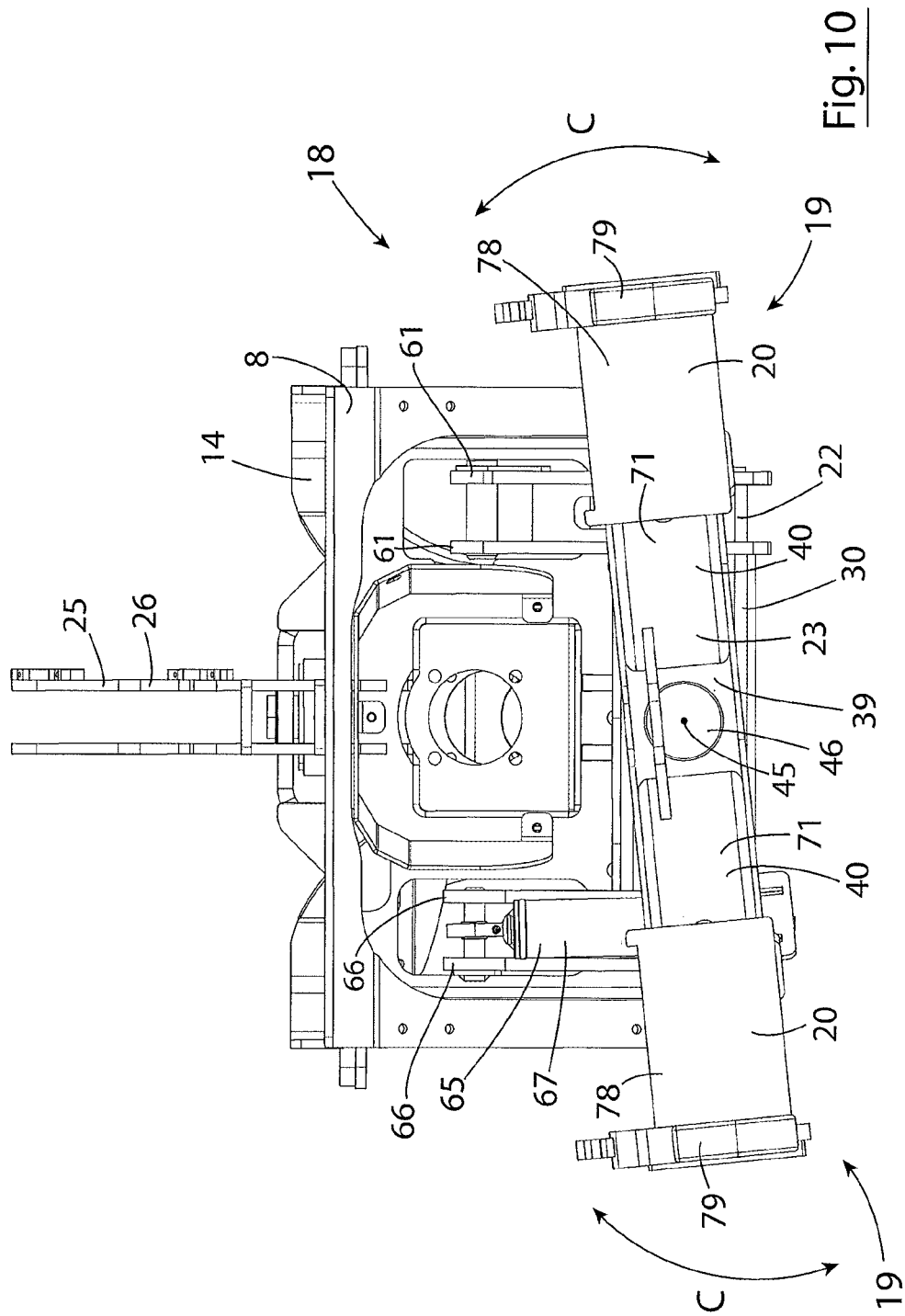
Figure 11:
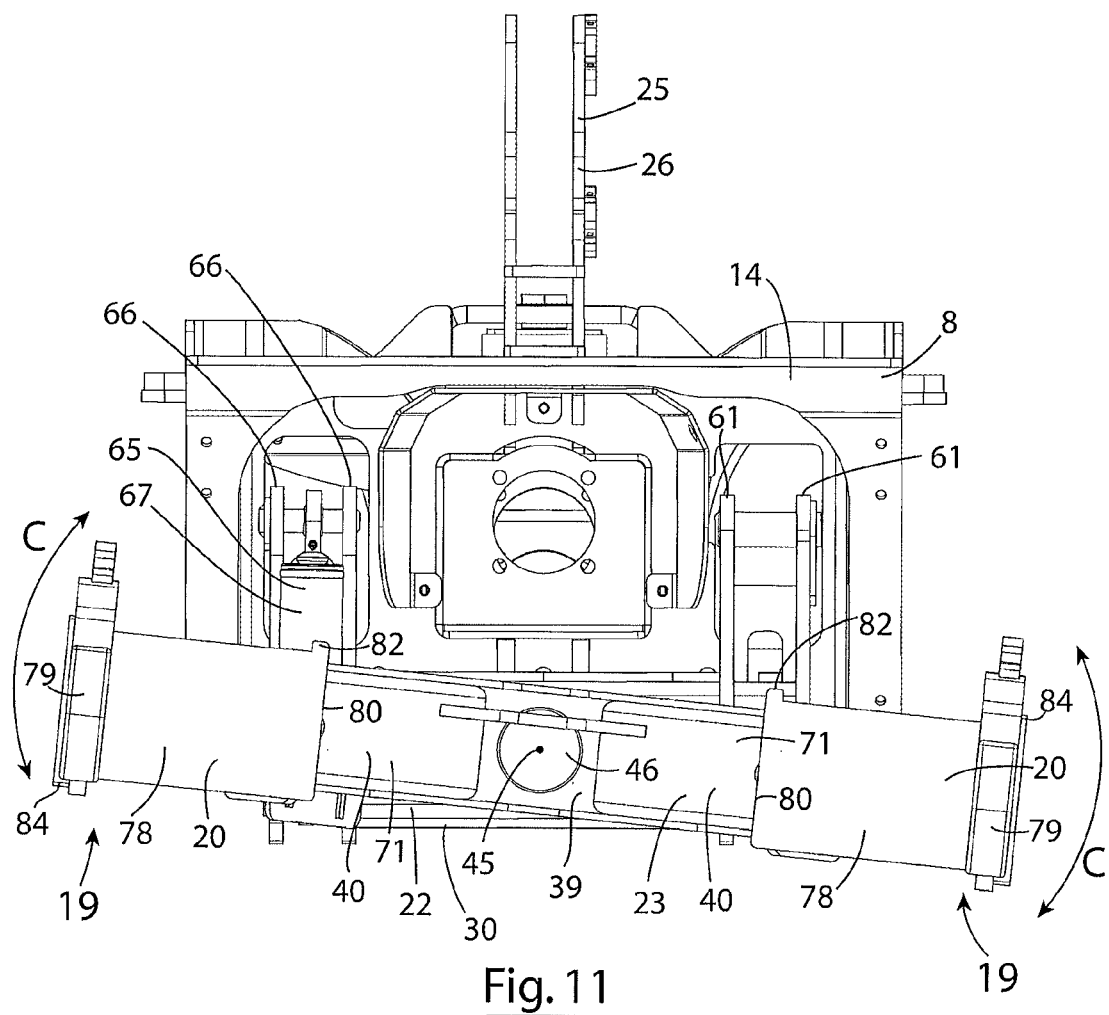
Figure 15:
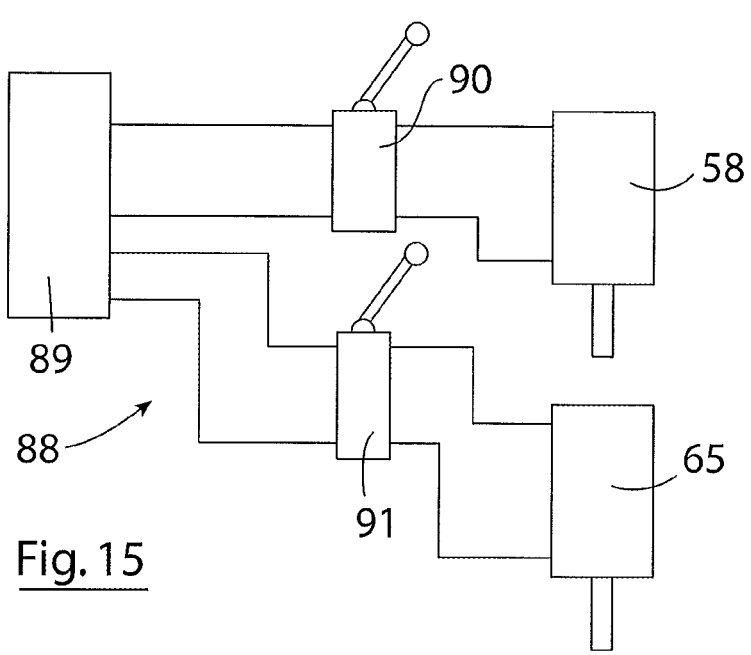
Figure 12:
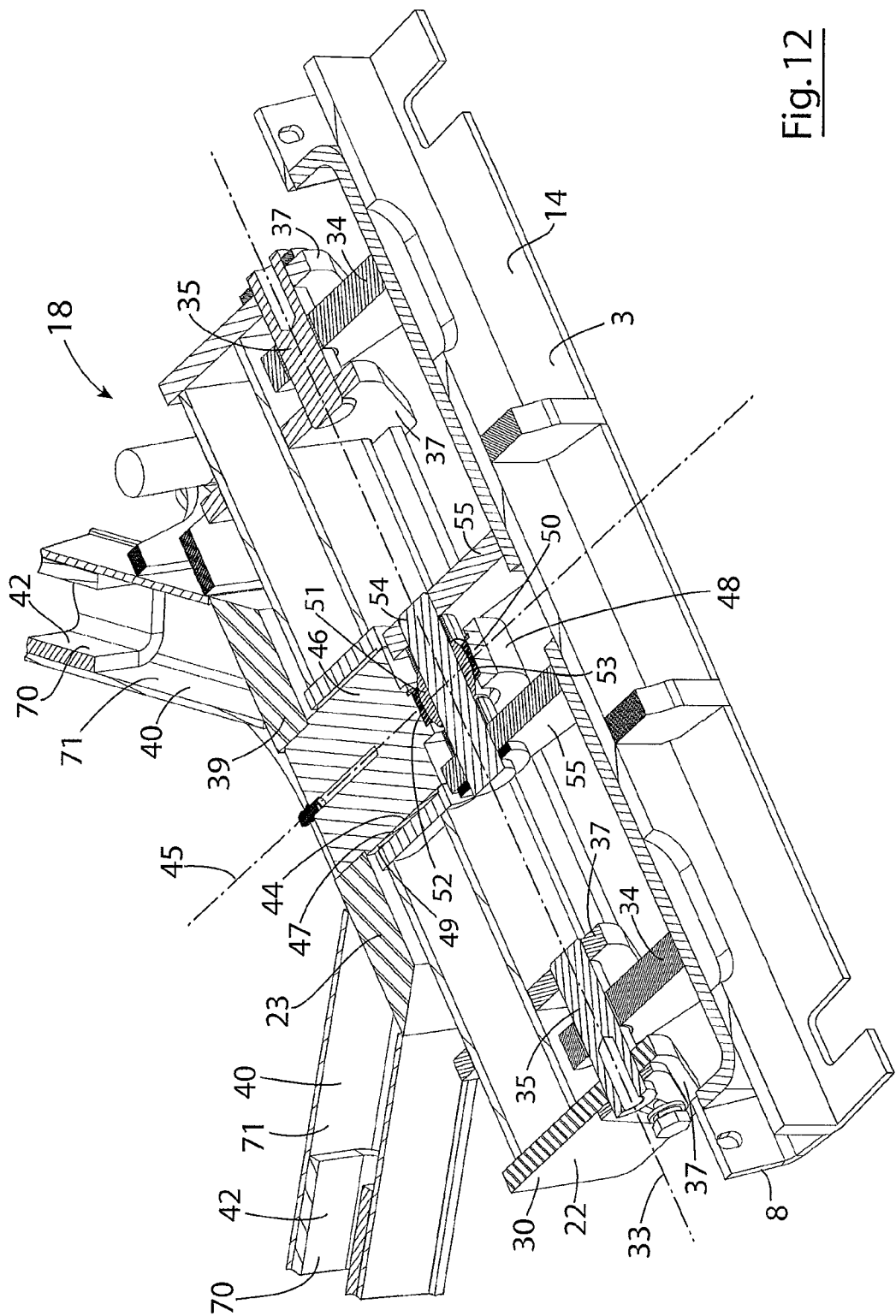
Figure 13:
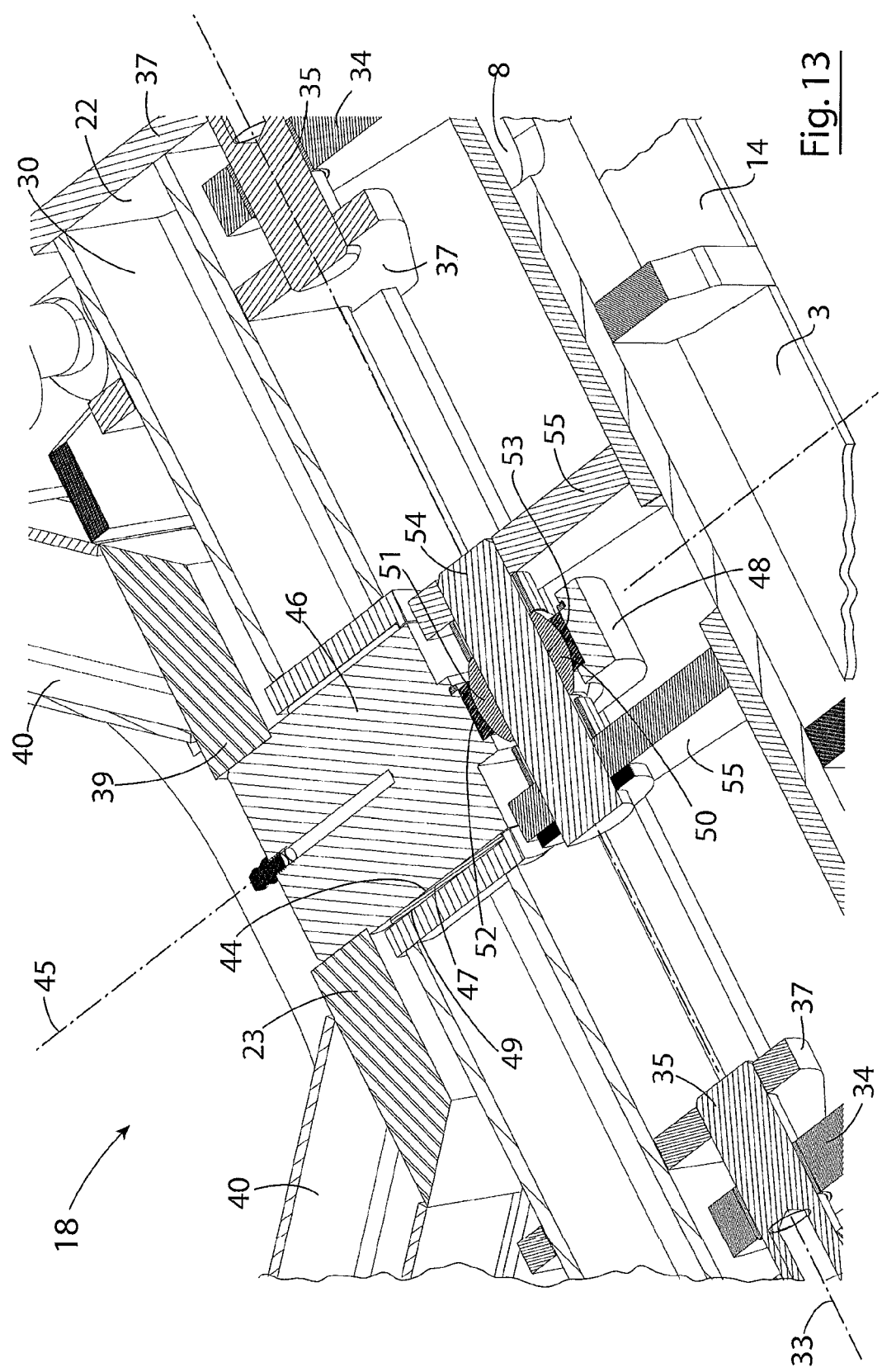
Figure 14:
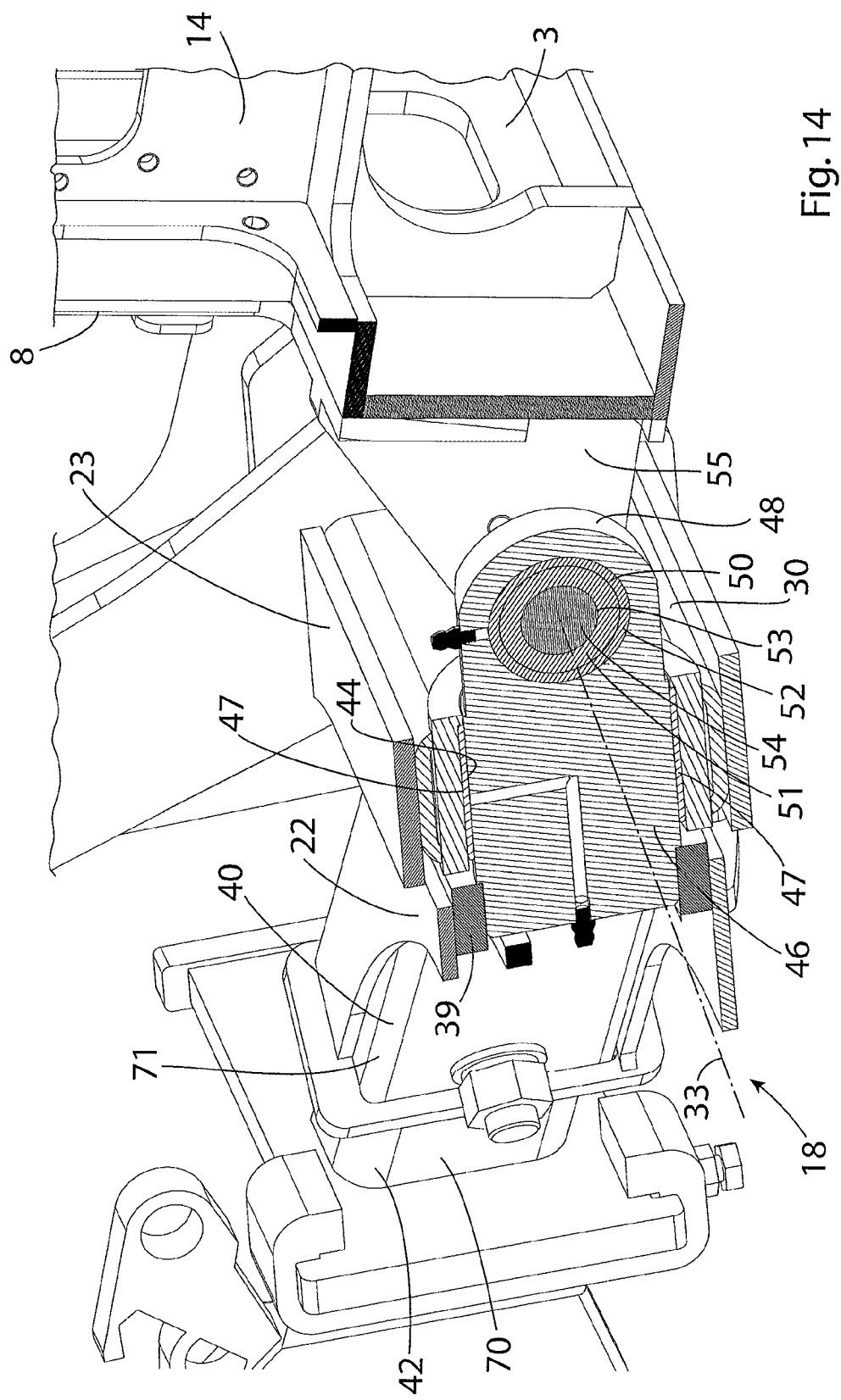

FIG. 3 is another perspective view of the portion of FIG. 2 of the work vehicle of FIG. 1, FIG. 4 is a further perspective view of the portion of FIG. 2 of the work vehicle of FIG. 1 illustrating a part of the portion of FIG. 2 in a different position to that of FIG. 2, FIG. 5 is a front end elevational view of the portion of FIG. 2 of the work vehicle of FIG. 1, FIG. 6 is a side elevational view of the portion of FIG. 2 of the work vehicle of FIG. 1, FIG. 7 is a cross-sectional rear end elevational view of the portion of FIG. 2 on the line VII-VII of FIG. 6 of the work vehicle of FIG. 1, FIG. 8 is cross-sectional side elevational view of the portion of FIG. 2 on the line VIII-VIII of FIG. 5 of the work vehicle of FIG. 1, FIG. 9 is a cross-sectional top plan view of a part of the portion of FIG. 2 on the line IX-IX of FIG. 5 of the work vehicle of FIG. 1, FIG. 10 is a front end elevational view of the portion of FIG. 2 of the work vehicle of FIG. 1 illustrating a part of the portion of FIG. 2 in a different position to that of FIG. 2, FIG. 11 is a front end elevational view of the portion of FIG. 2 of the work vehicle of FIG. 1 illustrating the part of the portion of FIG. 2 in a further different position to that of FIGS. 2 and 10, FIG. 12 is an enlarged sectional perspective view of a portion of the work vehicle of FIG. 1, FIG. 13 is an enlarged sectional perspective view of a detail of the portion of FIG. 12 of the work vehicle of FIG. 1, FIG. 14 is an enlarged sectional perspective view of another detail of the portion of FIG. 13 of work vehicle of FIG. 1, and FIG. 15 is a circuit diagram of a part of an hydraulic circuit of the work vehicle of FIG. 1.

Referring to the drawings, there is illustrated a work vehicle according to the invention, indicated generally by the reference numeral 1. The work vehicle 1 comprises a chassis 3 carried on a pair of forward ground engaging wheels 4 and a pair of rearward ground engaging wheels 5. A driver's cab 7 is mounted on the chassis 3 towards a front end 8 thereof. A rear housing 10 is mounted on the chassis 3 towards a rear end 11 thereof for housing an engine (not shown) mounted on the chassis 3. The work vehicle 1 in this embodiment of the invention is of the type in which the chassis 3 is formed in two parts, namely, a forward chassis part 14 and a rearward chassis part 15 which are pivotally coupled together about a central substantially vertically extending primary pivot axis (not shown) which is located between the cab 7 and the rear housing 10 to permit steering of the work vehicle 1 and to permit sideward tilting of the forward chassis part 14 and the rearward chassis part 15 of the chassis 3 relative to each other. Hydraulically powered steering rams (not shown) are connected between the forward chassis part 14 and the rearward chassis part 15 on respective opposite sides of the primary pivot axis (not shown), and are operable for steering the work vehicle 1. The driver's cab 7 is mounted on the forward chassis part 14 which also carries the forward ground engaging wheels 4. The rearward chassis part 15 carries the rearward ground engaging wheels 5, while the engine is mounted on the rearward chassis part 15 and is housed within the rear housing 10. The general construction of such work vehicles as the work vehicle 1 will be well known to those skilled in the art, and it is not intended to describe the general construction of the work vehicle 1 in further detail.

Coupling apparatus 18 is mounted on the forward chassis part 14 on the front end 8 thereof for coupling one of many attachment (not shown) to be carried on the front end 8 of the work vehicle 1 and to be powered by the work vehicle 1. Such an attachment may comprise a crop mower, a lawn mower, a hedge cutter or trimmer, a sprayer for herbicide, insecticide or fertiliser, a driven rotatably mounted elongated transversely extending cylindrical brush, an elongated transversely extending plough blade, a snow blower or other such attachment which will be well known to those skilled in the art.

The coupling apparatus 18 in this embodiment of the invention comprises a three-point linkage mechanism which comprises a pair of lower coupling elements 19, provided by a pair of transversely spaced apart first coupling elements 20, which are spaced apart transversely relative to the direction of normal forward motion of the work vehicle 1, namely, in the direction of the arrow A. The first coupling elements 20 are coupled to the forward chassis part 14 by a first carrier element 22 and a second carrier element 23 as will be described in detail below. An upper coupling element 25 of the three-point linkage mechanism is provided by a second coupling element 26 which is rigidly mounted on the forward chassis part 14. The second coupling element 26 comprises a pair of spaced apart coupling brackets 27 which are mounted on and extend upwardly from the forward chassis part 14 adjacent the front end 8 thereof. The coupling brackets 27 are each provided with a pair of corresponding bores 28 for receiving a coupling pin (not shown) in one of a selected pair of the bores 28 for coupling an upper link (not shown) of the three-point linkage to the second coupling element 26.

Turning now to the first carrier element 22, the first carrier element 22 which is pivotally coupled to the forward chassis part 14 adjacent the front end 8 thereof about a main transverse pivot axis 33 which extends transversely relative to the direction of normal forward motion of the work vehicle 1. The first carrier element 22 comprises a first transverse member 30. A pair of main pivot mountings 34 extending forwardly from the front end 8 of the forward chassis part 14 at transversely spaced apart locations pivotally carry corresponding main transverse pivot shafts 35 which define the main transverse pivot axis 33. Two pairs of main mounting brackets 37 located at respective opposite ends of the first transverse member 30 extend rearwardly from the first transverse member 30, and engage the corresponding ones of the main transverse pivot shafts 35 for coupling the first transverse member 30 to the main transverse pivot shafts 35. The main transverse pivot shafts 35 are axially aligned and define a common pivot axis which in turn defines the main transverse pivot axis 33 about which the first transverse member 30, and in turn the first carrier element 22 are pivotal relative to the forward chassis part 14.

The second carrier element 23 comprises a second transverse member 39 and a pair of guide members 40 extending from the second transverse member 39 at respective opposite ends thereof, for in turn carrying corresponding carrier members 42, on which the respective first coupling elements 20 are carried, as will be described in detail below.

The second carrier element 23 is pivotally coupled to the forward chassis part 14 about a generally longitudinally extending main longitudinal pivot axis 45, which extends substantially perpendicularly to the main transverse pivot axis 33, and which intersects the main transverse pivot axis 33, as will be described below. The second carrier element 23 is also pivotally coupled to the forward chassis part 14 about the main transverse pivot axis 33, and is pivotally carried in the first carrier element 22 about the main longitudinal pivot axis 45. Accordingly, the second carrier element 23 is pivotal with the first carrier element 22 relative to the forward chassis part 14 about the main transverse pivot axis 33 for facilitating upward and downward movement of the second carrier element 23 and in turn the first coupling elements 20 in the directions of the arrows B. The second carrier element 23 is pivotal relative to the forward chassis part 14 and the first carrier element 22 about the main longitudinal pivot axis 45 for facilitating tilting movement of the second carrier element 23 from side to side of the work vehicle 1 relative to the first carrier element 22 and relative to the forward chassis part 14, for in turn facilitating tilting movement of the first coupling elements 20 in the direction of the arrows C relative to the work vehicle 1.

A main longitudinal pivot shaft 46 is rigidly secured to and extends generally rearwardly from the second transverse member 39 of the second carrier element 23 at a location mid-way between the respective opposite ends of the second transverse member 39. The main longitudinal pivot shaft 46 defines the main longitudinal pivot axis 45 and is pivotally carried in a bearing 47 located in a bore 49 extending through the first transverse member 30 of the first carrier element 22 mid-way between the respective opposite ends of the first transverse member 30. The bearing 47 defines a pivot bore 44 through which the main longitudinal pivot shaft 46 extends and is pivotal therein about the main longitudinal pivot axis 45. The main longitudinal pivot shaft 46 extends through the bearing 47 in the first transverse member 30 and terminates in a swivel coupling carrier 48 which carries a swivel coupling, namely, a swivel bearing 50.

The swivel bearing 50 comprises an inner shell 51 and an outer shell 52 which is rotatably and swivelably mounted on the inner shell 51. The outer shell 52 is rigidly secured in the swivel coupling carrier 48. A central bore 53 extends through the inner shell 51 for accommodating and rigidly engaging a transversely extending intermediate transverse pivot shaft 54 therethrough. The intermediate transverse pivot shaft 54 is rigidly carried in a pair of spaced apart intermediate mountings 55 which extend forwardly from the forward chassis part 14 at the front end 8 thereof intermediate the main pivot mountings 34. The intermediate mountings 55 carry the intermediate transverse pivot shaft 54, so that the intermediate transverse pivot shaft 54 is axially aligned with the main transverse pivot shafts 35, and the intermediate transverse pivot shaft 54 defines a common pivot axis with the main transverse pivot shafts 35, which in turn defines the main transverse pivot axis 33 about which the first and second carrier elements 22 and 23 are pivotal relative to the forward chassis part 14.

The swivel bearing 50 is configured in the swivel coupling carrier 48, so that the outer shell 52 of the swivel bearing 50 is rotatable on the inner shell 51 about a transverse axis which coincides with the main transverse pivot axis 33, and is swivelable on the inner shell 51 about a longitudinal axis which coincides with the main longitudinal pivot axis 45. Accordingly, the main longitudinal pivot axis 45 intersects the main transverse pivot axis 33 at the centre of the swivel bearing 47, so that the second carrier element 23 is simultaneously pivotal about the main transverse pivot axis 33 and about the main longitudinal pivot axis 45. This pivotal coupling of the second carrier element 23 to the forward chassis part 14 about the main transverse pivot axis 33 and the main longitudinal pivot axis 45 permits simultaneous upwardly and downwardly movement of the second carrier element 23 about the main transverse pivot axis 33 and tilting movement of the second carrier element 23 about the main longitudinal pivot axis 45 relative to the forward chassis part 14 for accommodating upward and downward movement and tilting movement of an attachment attached to the second carrier element 23 as the attachment follows the contours of the ground as the work vehicle 1 traverses over the ground.

A first carrier element urging means comprising a first hydraulic actuator, namely, a first double acting hydraulic ram 58 is coupled between the first carrier element 22 and the forward chassis part 14 for pivoting the first carrier element 22, and in turn the second carrier element 23, about the main transverse pivot axis 33. A pair of pivotal mounting brackets 59 mounted on the forward chassis part 14 pivotally couple a cylinder 60 of the first hydraulic ram 58 to the forward chassis part 14, while a pair of pivot mounting brackets 61 extending upwardly from the first transverse member 30 of the first carrier element 22 pivotally couple a piston rod 62 of the first hydraulic ram 58 to the first carrier element 22.

A second carrier element urging means comprising a second hydraulic actuator, namely, a second double acting hydraulic ram 65 coupled between the first carrier element 22 and the second carrier element 23 pivots the second carrier element 23 about the main longitudinal pivot axis 45 relative to the first carrier element 22 and relative to the forward chassis part 14. A pair of pivot mounting brackets 66 extending upwardly and forwardly from the first transverse member 30 of the first carrier element 22 pivotally engage a cylinder 67 of the second hydraulic ram 65, while a pair of pivot mounting brackets 68 extending rearwardly from an adjacent one of the guide members 40 of the second carrier element 23 pivotally engage a piston rod 69 of the second hydraulic ram 65.

Returning now to the second carrier element 23, in this embodiment of the invention the carrier members 42 and the guide members 40 of the second carrier element 23 are formed by respective pairs of inner and outer telescoping members 70 and 71. The inner telescoping members 70 form the carrier members 42 on which the first coupling elements 20 are carried, while the outer telescoping members 71 which form the guide members 40, diverge outwardly in a generally forwardly direction from the respective opposite ends of the second transverse member 39 of the second carrier element 23. In this embodiment of the invention the guide members 40 extend from the second transverse members 39 of the second carrier element 23 at an angle of approximately 40° to the main longitudinal pivot axis 45 and define an included angle α therebetween of approximately 80°, see FIG. 9.

The carrier members 42 formed by the inner telescoping members 70 are slideable within the guide members 40 formed by the outer telescoping members 71 for adjusting the transverse spacing between the first coupling elements 20. By urging the carrier members 42 inwardly and outwardly of the guide members 40, the transverse spacing between the first coupling elements 20 is adjustable. The guide members 40 are equi-spaced apart on either side of the main longitudinal pivot axis 45 and the guide members 40 are of similar length. Thus, by setting the carrier members 42 to extend similar distances from the respective guide members 40, the first coupling elements 20 are equi-spaced apart on respective opposite sides of the main longitudinal pivot axis 45. Bores 72 extending through the outer telescoping members 71 are alignable with a plurality of corresponding bores 73 extending through the inner telescoping members 70, and screws 75 are provided for engaging the bores 72 and a selected one of the bores 73 in the respective inner telescoping members 70 for securing the carrier members 42 relative to the guide members 40 with the first coupling elements 20 transversely spaced apart at the desired spacing.

In this embodiment of the invention the first coupling elements 20 comprise respective coupling plates 78 on which respective couplers 79 of the lower coupling elements 19 of the three-point linkage may be adjustably and slideably mounted. Each coupling plate 78 terminates at its inner end 80 in an upwardly extending stop member 82 integrally formed with the coupling plate 78 for retaining the corresponding coupler 79 on the coupling plate 78. Each coupling plate 78 terminates at its outer end 83 in a releasably engageable stop member 84, which extends both upwardly and downwardly beyond the coupling plate 78 for similarly retaining the corresponding coupler 79 on the coupling plate 78. A pair of screws 85 through corresponding bores 86 in each stop member 84 are engageable with threaded bores (not shown) formed in the corresponding coupling plate 78 for releasably securing the stop member 84 to the coupling plate 78. By removing the stop members 84, the couplers 79 can be replaced. The couplers 79 are slideable along the coupling plates 78 for providing further transverse adjustment of the spacing between the couplers 79. Each coupler 79 comprises a suitable clamping mechanism (not shown) for clamping the coupler 79 at a desired location on the corresponding clamping plate 78.

Referring now to FIG. 15, a control means, namely, an hydraulic control circuit 88 is illustrated for controlling operation of the first and second hydraulic rams 58 and 65, respectively. An hydraulic pump 89 which is powered by the engine (not shown) of the work vehicle 1 provides a pressurised hydraulic power supply for powering the operation of the first and second hydraulic rams 58 and 65. The hydraulic power supply is delivered from the hydraulic pump 89 to the first hydraulic ram 58 through a first manually operated hydraulic control valve 90, and the hydraulic power supply is delivered from the hydraulic pump 89 to the second hydraulic ram 65 through a second manually operated hydraulic control valve 91. The first and second control valves 90 and 91 are joystick controlled valves and are located in the driver's cab 7.

The first and second valves 90 and 91 are each configurable to operate the corresponding ones of the first and second hydraulic rams 58 and 65 in two modes, namely, an active mode and a passive mode. In the active mode the first and second hydraulic rams 58 and 65 are independently operable by the first and second control valves 90 and 91 under the control of the driver in the driver's cab 7 for pivoting the first and second carrier elements 22 and 23 about the main transverse pivot axis 33 and for pivoting the second carrier element 23 about the main longitudinal pivot axis 45. In the passive mode the first and second hydraulic rams 58 and 65 operate in a passive or floating state whereby the pistons (not shown) in the corresponding cylinders 60 and 67 of the respective first and second hydraulic rams 58 and 65 are free floating, in order to permit the first and second carrier elements 22 and 23 to freely pivot about the main transverse pivot axis 33 and to permit the second carrier element 23 to freely pivot about the main longitudinal pivot axis 45 in response to upward and downward movement and tilting movement of an attachment carried on the coupling apparatus 18 of the work vehicle 1 as the attachment follows the contours of the ground as the work vehicle 1 traverses over the ground with the attachment coupled thereto by the coupling apparatus 18.

A power take-off shaft 93 extends from the forward chassis 14 at the front end 8 thereof in order to provide rotation mechanical drive to an attachment attached by the coupling apparatus 18 to the work vehicle 1. The power take-off shaft 93 is powered by the engine (not shown) through a suitable drive transmission.

Hydraulic and electrical couplers 94 and 95 are mounted on the front end 8 of the forward chassis part 14 on respective opposite sides thereof for providing hydraulic and electrical power supplies, respectively to the attachment. The hydraulic and electrical power supplies which are provided through the couplers 94 and 95, respectively, are controlled by suitable valves and control switches located in the cab 7 which are controlled by the driver.

In use, prior to coupling the attachment (not shown) to the work vehicle 1 by the coupling apparatus 18, the carrier members 42 are adjusted in the guide members 40 so that the coupling plates 78 of the first coupling elements 20 are at the desired transverse spacing. The carrier members 42 are retained relative to the guide members 40 with the coupling plates 78 at the desired spacing by the screws 75 through the bores 72 and 73 of the guide members 40 and the carrier members 42. With the releasable stop members 84 disengaged from the coupling plates 78, suitable couplers 79, which are dependent on the attachment to be coupled to the work vehicle 1 are mounted on the coupling plates 78, and the releasable stop members 84 are secured to the coupling plates 78 by the screws 85. The position of the couplers 79 on the coupling plates 78 is adjusted so that the couplers 79 are at the desired transverse spacing for engaging corresponding lower mountings of the attachment to be coupled to the work vehicle 1 by the coupling apparatus 18. The clamping mechanisms (not shown) are operated for securing the couplers 79 to the coupling plates 78 at the desired locations.

The work vehicle 1 is then driven to the attachment to be attached to the work vehicle 1, and with the first and second control valves 90 and 91 in the active mode, the first and second hydraulic rams 58 and 65 are operated for aligning the couplers 79 of the first coupling elements 20 with the corresponding lower mountings of the attachment. The couplers 79 are then secured to the lower mountings of the attachment, and the second coupling element 26 is secured to the upper mounting of the attachment by a suitable connecting link. The attachment is then raised off the ground by pivoting the first carrier element 22 about the main transverse pivot axis 33 by the first hydraulic ram 58. If it is desired to tilt the attachment relative to the work vehicle 1, the second carrier element 23 is pivoted relative to the first carrier element 22 about the main longitudinal pivot axis 45 by the second hydraulic ram 65. With the attachment coupled to the work vehicle 1 by the coupling apparatus 18, the input drive shaft of the attachment is suitably coupled to the power take-off shaft 93, typically, by a Cardan shaft. Hydraulic and electrical power supplies as required are provided to the attachment through the hydraulic and electrical power supply couplers 94 and 95, and the work vehicle 1 and the attachment is ready for use.

Initially, with the first and second valves 90 and 91 in the active mode, the attachment is lowered to the ground by pivoting the first carrier element 22 about the main transverse pivot axis 33 by operating the first hydraulic ram 58 by the first hydraulic control valve 90. Thereafter, the first and second control valves 90 and 91 are operated into the passive mode, in order that the first and second hydraulic rams 58 and 65 operate in the passive or floating state to allow the first and second carrier elements 22 and 23 to float in order to allow the attachment to float and follow the contours of the ground as the work vehicle 1 traverses the ground by pivoting about the main transverse pivot axis 33 and the main longitudinal pivot axis 45 as appropriate.

While the coupling apparatus 18 has been described as being located on the front end of the chassis of the work vehicle, it will be readily apparent to those skilled in the art that the coupling apparatus may be attached to the chassis adjacent the rear end thereof. It will also be appreciated that while specific constructions of first and second carrier elements 22 and 23 have been described, carrier elements of any other suitable or desired construction may be provided.

Needless to say, it will be appreciated that the second carrier element may be provided by a single transversely extending member on which the first coupling elements 20 would be directly mountable, and would be also adjustable transversely in order to facilitate adjustment of the transverse spacing between the first coupling elements 20. It will also be appreciated that while it is desirable, it is not essential that the first coupling elements be transversely adjustable.

While a power take-off shaft has been described as extending from the forward end of the work vehicle, it is envisaged that in certain cases the power take-off shaft adjacent the forward end of the work vehicle may be dispensed with. It will also be appreciated that a power take-off shaft may or may not be provided adjacent the rear end of the work vehicle.

While the coupling apparatus has been described as being provided in the form of a three point linkage, in certain embodiments of the invention, the coupling apparatus may be provided with only the lower two couplers, namely, the two first coupling elements. In which case, the upper coupling element would be dispensed with. Indeed, in certain cases, it is envisaged that the first coupling elements may be configured in a form to receive respective tines so that the coupling apparatus would be provided in the form of a forklift.

It is also envisaged that instead of the first coupling elements being provided by coupling plates for receiving couplers of the type illustrated, and in the manner described, it is envisaged that the first coupling elements may be provided in the form of a plate or other suitable transversely extending member which would be provided with elongated transversely extending slots for receiving suitable couplers, tines or other such arrangements or attachments. Indeed, in certain cases, it is envisaged that the coupling plates of the first coupling elements could be provided with transversely extending elongated slots for receiving such couplers or tines. The transversely extending elongated slots would be provided to facilitate adjusting the transverse spacing between the couplers or the tines as the case may be.

While the guide members which extend from the second transverse member of the second carrier element have been described as extending from the second transverse member, each at an angle of approximately 40° to the main longitudinal pivot axis, it is envisaged that the guide members may extend from the second transverse member at any suitable angle relative to the main longitudinal pivot axis. Typically, it is envisaged that the guide members may extend from the second transverse member at any angle to the main longitudinal pivot axis in the range of 30° to 90°, and ideally, in the range of 40° to 80°.

Needless to say, in certain cases, it is envisaged that the guide members may be omitted and the carrier members may be mounted at respective opposite ends of the second transverse member, and ideally, would telescope into and out of the respective opposite ends of the second transverse member for facilitating adjustment of the transverse spacing between the coupling elements.

It is also envisaged that instead of the first coupling elements being coupled by the carrier members and the guide members to the second carrier element, the guide members and the carrier members may be replaced by respective single carrier arms, which would be secured directly to the second carrier element by, for example, welding, and the first coupling elements would be secured directly to the carrier arm. In which case, the carrier arm would not be adjustable in length.

While the control valves for controlling the operation of the first and second hydraulic rams have been described as being manually controlled valves by respective joysticks, the first and second control valves may be provided by any suitable hydraulic control valve, which may be solenoid operated, operated by a pilot hydraulic supply or manually operated in any other manner. Needless to say, in cases where the first and second control valves are controlled by either a pilot hydraulic supply or electrical supply, as for example a solenoid operated valve, the first and second control valves may be located externally of the driver's cab, and suitable manual controls would be located in the cab for controlling such valves.

The invention claimed is:
1. A work vehicle comprising:
a chassis, and
a coupling apparatus for coupling an attachment to the work vehicle,
the coupling apparatus comprising:
a first carrier element pivotally coupled to the chassis about a main transverse pivot axis extending transversely of the direction of normal forward motion of the work vehicle, and
a second carrier element carrying a pair of transversely spaced apart first coupling elements, the second carrier element being pivotally coupled to the chassis about the main transverse pivot axis and about a main longitudinal pivot axis, the main longitudinal pivot axis extending substantially perpendicularly to and through the main transverse pivot axis, and the second carrier element being pivotal relative to the first carrier element about the main longitudinal pivot axis,
the coupling apparatus being configured as a three-point linkage, the first coupling elements defining respective lower coupling elements of the three-point linkage, and
a second coupling element being coupled to the chassis to form an upper coupling element of the three-point linkage.

2. A work vehicle as claimed in claim 1 in which the main longitudinal pivot axis intersects the main transverse pivot axis.

3. A work vehicle as claimed in claim 1 in which the second carrier element is pivotally coupled to the chassis by a swivel coupling defining a transverse pivot axis and a longitudinal pivot axis and providing pivotal movement about the respective transverse and longitudinal pivot axes, the swivel coupling being coupled to the chassis with the transverse pivot axis thereof substantially coinciding with the main transverse pivot axis, and with the longitudinal pivot axis thereof substantially coinciding with the main longitudinal pivot axis.

4. A work vehicle as claimed in claim 3 in which a main longitudinally extending pivot shaft defining the main longitudinal pivot axis extends from the second carrier element, the main longitudinal pivot shaft being coupled to the swivel coupling with the longitudinal axis of the swivel coupling coinciding with the main longitudinal pivot axis.

5. A work vehicle as claimed in claim 4 in which the main longitudinal pivot shaft extends from the second carrier element through the first carrier element to the swivel coupling.

6. A work vehicle as claimed in claim 3 in which the first carrier element is pivotally coupled to the chassis on at least one main transverse pivot shaft defining the main transverse pivot axis.

7. A work vehicle as claimed in claim 6 in which the first carrier element is pivotally coupled to the chassis on a pair of the main transverse pivot shafts spaced apart from and axially aligned with each other, and defining the main transverse pivot axis.

8. A work vehicle as claimed in claim 7 in which the swivel coupling is carried on an intermediate transverse pivot shaft carried on the chassis and axially aligned with the at least one main transverse pivot shaft, the intermediate transverse pivot shaft defining with the at least one main transverse pivot shaft the main transverse pivot axis.

9. A work vehicle as claimed in claim 8 in which the swivel coupling comprises a swivel bearing having an inner shell mounted fast on the intermediate transverse pivot shaft, and an outer shell rotatably and swivelably mounted on the inner shell, so that the outer shell is pivotal on the inner shell about the main transverse pivot axis and the main longitudinal pivot axis.

10. A work vehicle as claimed in claim 8 in which the intermediate transverse pivot shaft is located intermediate the locations at which the main transverse pivot shafts are located.

11. A work vehicle as claimed in claim 7 in which each main transverse pivot shaft is pivotally carried on a corresponding main pivot mounting on the chassis.

12. A work vehicle as claimed in claim 1 in which the second carrier element comprises a pair of guide members extending from the second carrier element, and a pair of corresponding carrier members carrying the respective first coupling elements slideably mounted relative to the guide members.

13. A work vehicle as claimed in claim 1 in which a first carrier element urging means is provided for urging the first carrier element about the main transverse pivot axis and for in turn urging the second carrier element about the main transverse pivot axis.

14. A work vehicle as claimed in claim 13 in which the first carrier element urging means comprises one of a first hydraulic actuator and a first electrically powered actuator, the one of the first hydraulic actuator and the first electrically powered actuator is configurable in an active mode for pivoting the first carrier element about the main transverse pivot axis, and in a passive mode for permitting the first carrier element, and in turn the second carrier element to float relative to the chassis about the main transverse pivot axis.

15. A work vehicle as claimed in claim 1 in which a second carrier element urging means is provided for urging the second carrier element about the main longitudinal pivot axis.

16. A work vehicle as claimed in claim 15 in which the second carrier element urging means comprises one of a second hydraulic actuator and a second electrically powered actuator, the one of the second hydraulic actuator and the second electrically powered actuator is configurable in an active mode for pivoting the second carrier element about the main longitudinal pivot axis, and a passive mode for permitting the second carrier element to float relative to the first carrier element about the main longitudinal pivot axis.

17. A work vehicle as claimed in claim 1 in which the work vehicle comprises a forward part and a rearward part coupled together about a substantially vertically extending primary pivot axis for facilitating steering of the work vehicle.

18. A work vehicle comprising:
a chassis, and
a coupling apparatus for coupling an attachment to the work vehicle,
the coupling apparatus comprising:
a first carrier element pivotally coupled to the chassis on a pair of main transverse pivot shafts spaced apart transversely from and axially aligned with each other, and defining a main transverse pivot axis extending transversely of the direction of normal forward motion of the work vehicle about which the first carrier element is pivotal, and
a second carrier element carrying a pair of transversely spaced apart first coupling elements, the second carrier element being pivotally coupled to the chassis about the main transverse pivot axis and about a main longitudinal pivot axis, the main longitudinal pivot axis extending substantially perpendicularly to and through the main transverse pivot axis, and the second carrier element being pivotal relative to the first carrier element about the main longitudinal pivot axis.

19. A work vehicle comprising:
a chassis, and
a coupling apparatus for coupling an attachment to the work vehicle,
the coupling apparatus comprising:
a first carrier element pivotally coupled to the chassis about a main transverse pivot axis extending transversely of the direction of normal forward motion of the work vehicle, and
a second carrier element carrying a pair of transversely spaced apart first coupling elements, the second carrier element being pivotally coupled to the chassis about the main transverse pivot axis and about a main longitudinal pivot axis, the main longitudinal pivot axis extending substantially perpendicularly to and through the main transverse pivot axis, and the second carrier element being pivotal relative to the first carrier element about the main longitudinal pivot axis, wherein the second carrier element is pivotally coupled to the chassis by a swivel coupling defining a transverse pivot axis and a longitudinal pivot axis and providing pivotal movement about the respective transverse and longitudinal pivot axes, the swivel coupling being coupled to the chassis with the transverse pivot axis thereof substantially coinciding with the main transverse pivot axis, and with the longitudinal pivot axis thereof substantially coinciding with the main longitudinal pivot axis, and a main longitudinally extending pivot shaft defining the main longitudinal pivot axis is rigidly connected to and extends from the second carrier element, the main longitudinal pivot shaft being pivotally coupled to the swivel coupling with the longitudinal axis of the swivel coupling coinciding with the main longitudinal pivot axis.

20. A work vehicle comprising:

a chassis, and a coupling apparatus for coupling an attachment to the work vehicle, the coupling apparatus comprising:

a first carrier element pivotally coupled to the chassis about a main transverse pivot axis extending transversely of the direction of normal forward motion of the work vehicle, and a second carrier element carrying a pair of transversely spaced apart first coupling elements, the second carrier element being pivotally coupled to the chassis about the main transverse pivot axis and about a main longitudinal pivot axis, the main longitudinal pivot axis extending substantially perpendicularly to and through the main transverse pivot axis, and the second carrier element being pivotal relative to the first carrier element about the main longitudinal pivot axis, wherein the second carrier element is pivotally coupled to the chassis by a swivel coupling defining a transverse pivot axis and a longitudinal pivot axis and providing pivotal movement about the respective transverse and longitudinal pivot axes, the swivel coupling being coupled to the chassis with the transverse pivot axis thereof substantially coinciding with the main transverse pivot axis, and with the longitudinal pivot axis thereof substantially coinciding with the main longitudinal pivot axis, a main longitudinally extending pivot shaft defining the main longitudinal pivot axis extends from the second carrier element, the main longitudinal pivot shaft being coupled to the swivel coupling with the longitudinal axis of the swivel coupling coinciding with the main longitudinal pivot axis, and the swivel coupling is carried in a swivel coupling carrier extending from the main longitudinal pivot shaft.

* * * * *